United States Patent Office 3,218,373
Patented Nov. 16, 1965

3,218,373
BLEND OF POLYSTYRENES AND A LIGHTLY CROSSLINKED COPOLYMER OF ETHYLENE AND A MONOETHYLENICALLY UNSATURATED ESTER
Ival O. Salyer, Dayton, Ohio, assignor to Monsanto Company, a corporation of Delaware
No Drawing. Filed May 15, 1961, Ser. No. 109,875
18 Claims. (Cl. 260—878)

This invention is directed to organic polymeric compositions containing a predominant portion of styrene polymer and a lesser amount of a partially cross-linked copolymer of ethylene and a monoolefinically unsaturated ester monomer selected from the group consisting of vinyl acetate and a lower alkyl acrylate, e.g., methyl acrylate, and the methods of producing these compositions.

It has not been previously known that styrene polymers are capable of forming sufficiently compatible blended compositions with solid ethylene/vinyl acetate and ethylene/methyl acrylate copolymers and especially those copolymers having high molecular weight. It has now been found, however, by preliminary partial cross-linking (partial curing) of already polymerized ethylene/vinyl acetate or ethylene/methyl acrylate copolymers that these copolymers are capable of forming compatible polymeric blended compositions with styrene, either in the already polymerized form (polystyrene), or with monomeric styrene which is then polymerized onto the already partially cured ethylene/vinyl acetate copolymer. The present invention allows the production of styrene-ethylene/vinyl acetate and styrene/methyl acrylate compositions which have impact strength and flexural deflection properties superior to those attainable with polystyrene itself.

The many valuable properties of styrene polymers are well known since this polymer has become one of our most important plastics of commerce. Unfortunately, this polymer has serious disadvantages namely, relatively poor impact resistance and flexural deflection, which preclude its extensive use in fabricating rigid articles which must withstand blows in normal usage. The overall strength properties of styrene polymers are poor so that the structural uses to which this material can be applied are severely hindered. There is a need for improvement of the impact resistance and toughness of polystyrene as well as the various other properties of styrene polymers which influence its capability to be employed in impact resistant and structural applications. It is well known that the impact strength, as well as the flexural deflection, of styrene polymers can be increased by intimately mechanically admixing with the already formed styrene polymer a butadiene/styrene rubbery copolymer to form a binary mechanical polyblend. However, large amounts of the butadiene/styrene rubbery copolymer are required in order to secure these improvements. Also the addition of a large amount of a butadiene/styrene copolymer rubber to polystyrene lowers the load bearing characteristics of the combined rubbery copolymer-polystyrene blend, to a point below that of polystyrene, itself, thus restricting its use. Furthermore, the unsaturated rubbers of the butadiene/styrene type have inherently poor oxidative ageing resistance; both alone and in blends with styrene or polystyrene.

I have discovered that styrene polymers having improved impact strength and good mechanical properties can be prepared by providing an ethylene/vinyl acetate copolymer, lightly cross-linking the rubbery copolymer, and then blending it with styrene either in the polymeric state (mechanical polyblending), or as monomeric styrene which is then polymerized in the presence of the partially cured ethylene/vinyl acetate copolymer (polymerization polyblending). In order to avoid repetition throughout the specification, the present description will be directed in the main part to polyblends of styrene with ethylene/vinyl acetate copolymers although it should be realized that generally everything which is stated in conjunction with the ethylene/vinyl acetate copolymers applies equally well to the ethylene/methyl acrylate copolymers. The few minor differences between the copolymers, as these differences apply to the present invention, will be discussed below in conjunction with the examples.

The terms "blend" and "polyblend" are synonymously used herein in a broad sense to include both mechanical blends of preformed partially cured ethylene/vinyl acetate copolymers with preformed polystyrene, and polymerization blends prepared by polymerizing monomeric styrene in the presence of partially cured preformed ethylene/vinyl acetate copolymers.

The terms "cross-linking" and "curing" are used synonymously herein in their usual chemically accepted sense to indicate bridging or linking between linear polymer chains to provide what is known in the art as a "three-dimensional structure."

While both the mechanical and polymerization procedures carried out in accordance with the present invention yield blended polystyrene compositions displaying enhanced impact strength without sacrificing load bearing characteristics, the polymerization polyblending procedure is preferred as it not only insures vastly improved impact strengths but also provides substantial improvement in flexural deflection.

The polymerization blending procedure involves providing a rubbery ethylene/vinyl acetate copolymer; lightly cross-linking this copolymer prior to incorporating it with monomeric styrene; introducing styrene monomer to swell the lightly cured ethylene/vinyl acetate copolymer so that it absorbs monomeric styrene and attains a substantial increase in volume; and then polymerizing the absorbed styrene monomer to a high degree of conversion.

The mechanical polyblending operation involves bringing the slightly cured ethylene/vinyl acetate copolymer and the preformed polystyrene together into intimate admixture by any suitable mechanical means, such as by milling on cold or heated mill rolls; mixing in a Banbury mixer; or mixing emulsions, suspensions, or dispersions of the two polymers and coagulating same; or by extrusion, etc.

An object of this invention is to provide improved styrene polymer compositions.

Another object of this invention is to provide compatible compositions of a lightly cured ethylene/vinyl acetate rubbery copolymer and polystyrene.

Another object of this invention is to improve the toughness, e.g., impact strength and flexural deflection properties, of styrene polymers without a substantial reduction in its load-bearing characteristics.

Another object of the present invention is to improve the impact resistance of styrene polymers by preparing a compatible polymerization blend of a predominant portion of styrene polymer and a low portion of a partially cross-linked ethylene/vinyl acetate copolymer wherein the resulting composition has excellent compatibility and freedom from "Dobry effect" phase separation.

A still further object of this invention is to produce directly by the method described, finished films, sheets, and shapes whose physical form is a three dimensional uniform expansion of that of the original lightly cross-linked rubber.

Other aspects, objects and advantages of this invention will be readily apparent from a conisderation of the accompanying disclosure and the appended claims.

In order to obtain polystyrene polymers having greatly improved impact strengths, yet still retaining good mechanical properties and compatibility of the polystyrene and ethylene/vinyl acetate components of the composition, it is essential to first lightly cross-link the ethylene/vinyl acetate rubber, and then blend it with styrene. By following the above indicated essential sequence, polystyrene polymers have been produced which exhibit Notched Izod impact strengths which greatly exceed that of polystyrene, itself, e.g., impact strengths approximating 1 foot-pound, often in excess of 4 foot-pounds, and frequently in excess of 7 foot-pounds, especially where polymerization blending is performed. The Notched Izod impact values referred to above are given in units of foot-pounds per inch of notch and are determined by the Izod method as set forth in ASTM D–256–47 T.

In addition these blended polystyrene compositions possess excellent compatibility of the two materials being associated, viz. the rubbery ethylene/vinyl acetate copolymer and the rigid polystyrene. In fact when the blending is carried out by the polymerization blending procedure the compatibility of these two components is so strong that they cannot readily be separated by mechanical means, and virtually the only way of separating them is by dissolving out the polystyrene polymer component. This excellent compatibility of the two chemically dissimilar components is truly valuable inasmuch as they do not evidence phase separation which often decreases strength, and causes the production of weak "cheesy" polymers.

For example when a polymer (or copolymer) is dissolved in a chemically dissimilar monomer (or monomers), and polymerization of the monomer (or monomers) is thereafter effected, the resulting polymers separate out into two readily visually recognized separate and distinct phases even when the polymerization of the monomer is carried out to low conversions. The generality of this behavior has been observed by Dobry (A. Dobry and F. Doyer-Kawenoki, J. Polymer Sci., vol. 2, p. 90, 1947). This phase separation presents a serious problem in dealing with high polymers and is generally characteristic of attempts at polymerizing materials which yield relatively high molecular weight polymers. This phase separation takes place at relatively low conversions when styrene/butadiene, polyethylene, butadiene/acrylonitrile, and other polymers are dissolved in styrene monomer and the styrene monomer is then subjected to mass polymerization.

The specific reasons why this phase separation does not occur in the compositions and polymerization blending procedures according to the present invention are not entirely understood. Perhaps since the network of the rubbery ethylene/vinyl acetate copolymer is lightly cross-linked prior to being swollen with styrene monomer to yield a highly swollen gel (which absorbs a considerable portion of styrene monomer), there may be formed molecular entanglements, wherein the linear chains of polystyrene become entangled within the loose three-dimensional framework of the slightly cross-linked ethylene/vinyl acetate copolymer. These "molecular entanglements" may constitute such an intimate association of the styrene polymer with the lightly cured ethylene/vinyl acetate copolymer that it is physically virtually impossible to separate the two components of the polymer system except by dissolving out the soluble polystyrene polymer component. Of course it is to be understood that the invention is not dependent upon, nor is it limited by, this or any other theory as regards the operation thereof.

Copolymers of ethylene and vinyl acetate have been known in the art for some time. However to my knowledge there has been no attempt to improve the impact resistance and flectural deflection properties of polystyrene by partially curing an ethylene/vinyl acetate copolymer and then forming a polyblend composition wherein polystyrene is intimately associated therewith either by mechanical or polymerization blending procedures.

ETHYLENE VINYL ACETATE COPOLYMER

The composition of the ethylene/vinyl acetate copolymer should be such that it contains a significant amount of vinyl acetate. Rubbery copolymer compositions containing 15 to 75% by weight of vinyl acetate can be employed in the process according to this invention. Ethylene/vinyl acetate copolymers containing 30 to 65% by weight of vinyl acetate are preferred as these compositions are more amenable to the preliminary partial curing step which must be performed in order to secure the beneficial aspects of the present invention. The use of ethylene/vinyl acetate copolymers containing 15 to 75% by weight of vinyl acetate, and more preferably 30 to 65% by weight of vinyl acetate, allows formation of multi-polymer polystyrene compositions which demonstrate marked improvement with regard to both impact strength and compatibility. Ethylene/vinyl acetate copolymer compositions containing about 40 to about 55% vinyl acetate (by weight of the copolymer) are of special interest since these compositions exhibit especially good cross-linking properties requiring a minimum amount of time to complete the partial cross-linking operation.

The ethylene/vinyl acetate copolymers utilized in the present invention can suitably be prepared by free radical catalyzed polymerization under high pressure and under the conditions generally employed in the high pressure polymerization of ethylene. The vinyl acetate content of the copolymers as used herein has reference to that part of the copolymer which derives its presence from the vinyl acetate monomer, as determinable by analyses of the copolymer, and in general approximates the vinyl acetate content of the monomers employed in the copolymerization mixture. While ordinarily the ethylene/vinyl acetate copolymers employed will be prepared exclusively from ethylene and vinyl acetate monomers, it will be understood that small amounts of one or more other polymerizable ethylenically unsaturated monomers, particularly vinyl monomers, can be included in the polymerization mixture and constitute part of the product, in amounts, for example of up to 15% or more by weight of the polymerizaton mixture particularly such monomers as vinyl isopropenyl acetate, vinyl chloride, acrylonitrile, vinyl oxyethanol, vinyl fluoride, vinylidene fluoride, vinylidene chlorofluoride, acrylate and methacrylate esters and the like, and that the use of all such copolymers in the presently described process is considered to be within the realm of the present invention.

It will be realized that the molecular weight of the ethylene/vinyl acetate copolymers employed in the present invention will have some influence on their melt viscosities which will in turn effect the processing properties of the rubber during the peroxide-incorporation step. In general, it is feasible to use ethylene/vinyl acetate copolymers of the required vinyl acetate content which have molecular weights varying from those just high enough to have value as solid moldable material up to and including molecular weights comparable to or greater than those of commercial high pressure polyethylenes. A general description of such useful molecular weights would be, for example, a range of number average molecular weights ($M_n$) varying from about 5,000 to 50,000 or higher; however, it will usually be preferred to utilize ethylene/vinyl acetate copolymers in the molecular weight ($M_n$) range of about 10,000 to about 30,000. The use of medium molecular weights, e.g., 20,000 to 30,000, makes it possible to readily incorporate the peroxide into the ethylene/vinyl acetate copolymer at the necessary low temperatures on conventional mill rolls, Banbury mixers, etc. The use of fairly low molecular weight ethylene/vinyl acetate copolymers is particularly indicated in the case of the lower vinyl acetate content rubbery copolymer compositions. The distribution of molecular weights in a particular copolymer employed can vary considerably, as shown by the fact that the weight average molecular weight ($M_w$) can vary widely, e.g., from 3 to 100 times the $M_n$ values although $M_w/M_n$ ratios not greater than 20 to 50 are preferred. $M_n$ and $M_w$ as employed herein have reference to molecular weights, and are determined by standard osmometric and light scattering procedures respectively. In general the ethylene/vinyl acetate copolymers employed in the present invention have melt indexes of about 0.1 to 50.0 dg. per minute (ASTM–D–1238–52T) or greater, and preferably have melt indexes in the range of about 3 to 15 dg. per minute, measured at 150° C.

PARTIAL CURING

The partial cross-linking operation, which will generally be performed after the ethylene/vinyl acetate copolymer has been formed by copolymerization can be conducted in a variety of ways. This partial cross-linking will usually be done by incorporating cross-linking catalysts, or curing agents, into the ethylene/vinyl acetate copolymer after it has been polymerized; however, the curing agent(s) may also be included at any degree of conversion while the ethylene and vinyl acetate are being copolymerized. It will generally be preferable to conduct this partial curing operation after formation of the ethylene/vinyl acetate copolymer however. The preferred ethylene/vinyl acetate copolymeric compositions are sufficiently fluid and sufficiently devoid of crystallinity to be eminently suitable for introduction of peroxide cross-linking agents. As exemplary of suitable organic peroxide cross-linking agents the following can be listed: dicumyl peroxide; di-tertiary-butyl peroxide; (2, 5-bis [teritiary-butyl peroxy] -2, 5-dimethyl hexane); tertiary-butyl peracetate; tertiary-butyl perbenzoate; cumene hydroperoxide; etc. The defined peroxides can be employed in admixture with, absorbed by, or adsorbed on various inert mineral or other fillers, e.g., calicum carbonate, silica, carbon black, etc., for convenience of incorporation into the polymer by mechanical blending, milling, mixing, or any other convenient method. Of course the prescribed concentrations of curing agents as stated herein denote the amount of essentially pure curing agent which is employed. If the curing agent is employed in admixture with inert fillers, the curing agent-filler constituent will, by necessity, be employed in higher weight concentration in order to insure the presence of the requisite amount of substantially pure curing agent. Thus the degree of cross-linking which is desired can be readily controlled merely by introducing the proper amount of cross-linking agent.

To effect a satisfactory partial cross-linking procedure it is generally necessary to employ at least about 0.05% of cross-linking agent by weight of the ethylene/vinyl acetate copolymer. The maximum amount of cross-linking agent can be used will depend upon whether or not melt flow (plastics flow when heated according to ASTM 1238–57T at 190° C. characteristics are required in the polyblend compositions of the present invention.

In situations where the styrene-ethylene/vinyl acetate polyblends are to be subjected to subsequent processing operations in which the polyblends are required to have a significant amount of melt flow, e.g., injection molding, extrusion forming, etc., the upper limit of the concentration of cross-linking agent is critical, and in order to secure the desired impact strength the maximum permissible amount of curing agent should ordinarily not exceed about 0.25% by weight of the ethylene/vinyl acetate rubbery copolymer. This is specially pertinent with regard to the production of finished articles which are molded to a thickness of at least about 0.125 inch. For such applications as injection molding, extrusion forming and comparable processing wherein the molding, processing, etc., takes place after the polymerization of styrene has occurred, the styrene-ethylene/vinyl acetate polyblends are subjected to a significant amount of energy, e.g., mechanical and thermal energy. It has been discovered that in order to insure the requisite melt flow characteristics, i.e., a melt index (ASTM 1238–57T) in general of 0.05 to 25.0 decigrams/minute at 190° C. and more preferably a melt index of 0.1 to 10.0 decigrams/minute at 190° C., the permissible concentration of curing agent is quite narrow and ordinarily must be from 0.05 to 0.25% by weight of the ethylene/vinyl acetate copolymer. Otherwise the polymer will not possess sufficient flow to be effectively molded, and the advantageous impact and flexural deflection properties will not be secured. The reasons for this required critical degree of light cross-linking, as reflected in the weight concentration of cross-linking agent, in preparing styrene-ethylene/vinyl acetate polyblends which are to be molded are not entirely understood. It is known, however, that when the polyblend compositions are cut, ground, granulated and molded, they are subjected to mechanical and thermal forces which tend to shear and degrade the polymers somewhat. Obviously this shearing and degradation has some deleterious effects upon polymer properties. Since these processing operations are "necessary evils" concomitant with molding and/or extrusion operations their unfavorable aspects must be minimized. A possible explanation would be that with less than 0.05% by weight of curing agent, e.g., dicumyl peroxide, there are not a sufficient number of cross-links to brace the polyblend against the shearing and thermal degradative forces which are later brought to bear upon these blends during processing and molding. On the other hand when the weight concentration of curing agent exceeds 0.25%, the ethylene/vinyl acetate copolymer is too tightly cross-linked to be able to possess that degree of flow when heated which the processing and molding operations require. Of course, it should be realized that the present invention is not necessarily limited by this or any other theory as to the operation thereof. For optimum mechanical properties it will be preferable to employ the curing agent in amounts of 0.05 to 0.15% by weight when the polystyrene-ethylene/vinyl acetate blended compositions are to be subjected to molding applications wherein the molding takes place after the polymerization of the styrene has been effected, and ordinarily the light curing will be effected at temperatures of about 100 to 200° C. with the more preferable temperature environment being about 125 to 175° C. The partial cross-linking should be carried out to the extent that the minimum number of cross-links per molecule of copolymer be 1.0 with the proviso that there be at least one cross-link per 1,000 monomer units in the ethylene/vinyl acetate copolymer molecule and the maximum number of cross-links should never exceed 1.0 cross-link per 100 monomer units in the copolymer molecule.

However, in situations where no melt flow is required in the ultimate polyblend, i.e., where the polystyrene-ethylene/vinyl acetate ultimate blend has a melt index of substantially zero; the concentration of curing agent is not critical and tolerably and even preferably in some cases exceeds the limit of 0.25% by weight (which is the maximum limit for molding compositions). This is especially true in the production of relatively thin sheets and "three-dimensional" articles wherein the thickness dimension of the lightly cured ethylene/vinyl acetate copolymer prior to swelling with styrene monomer is, e.g., from 0.003 to 0.015 inch. In cases where it is desired to produce these relatively thin sheets and "three dimensional" articles, the light cross-linking can conveniently be accomplished by employment of cross-linking agent in amounts of up to about 2.5% by weight of ethylene/vinyl acetate copolymer and more preferably in amounts of up to about 0.5% by weight of ethylene/vinyl acetate copolymer. As a matter of fact use of curing agent in concentrations significantly below 0.25% by weight of the ethylene/vinyl acetate copolymer will almost invariably cause curling and/or wrinkling to occur in the thinner, lightly cured ethylene/vinyl acetate sheets (e.g., those having a thickness of from 0.003 to 0.015 inch before swelling with styrene monomer).

According to one important aspect of the present invention, it is possible to prepare thin, dimensionally stable films, sheets and shaped articles whose ultimate physical form (after swelling with styrene monomer) is a three dimensional, geometrically uniform expansion of its previous form (viz. its form prior to swelling with styrene monomer). These dimensionally stable articles can be prepared in a free-expansion type mold, but the free-expansion molding operation must be conducted prior to the substantial completion of the polymerization of the styrene monomer, and more preferably the free-expansion molding operation occurs prior to the initiation of the styrene polymerization. For example an ethylene/vinyl acetate rubbery copolymer can be lightly cross-linked with a curing agent (e.g., dicumyl peroxide) employed in amounts of 0.25 to 2.50% by weight of the rubbery copolymer. The lightly cross-linked copolymer can then be formed into any desired shape, e.g., that of an "Easter bunny" of about 0.003 to 0.015 in. thickness (or the desired shaping can be imparted to the ethylene/vinyl acetate copolymer after incorporation of the curing agent but prior to thermal activation of curing, and curing thereafter effected). Then the already shaped, lightly cross-linked ethylene/vinyl acetate article can be swollen with styrene monomer to any desired extent, e.g., from about two to seven times its original volume. Then the shaped, swollen article can be placed in a mold which has the same geometric configurations as the preswollen, lightly-cured copolymer only is uniformly larger, in all dimensions. Such molds are often referred to in the art as "free-expansion" type molds. Instead of inserting the shaped swollen article in a mold, it can be placed on a conveyor belt and carried to an oven or other source of heat. In any event the shaped, swollen article can then be heated to effect polymerization of the styrene monomer. It will generally be desirable to substantially completely polymerize the styrene monomer, and preferably the polymerization of monomeric styrene is carried out to a conversion of at least 95%. If the preparation of a finished article having thermosetting properties is desired, difunctional monomers, e.g., divinyl benzene, diallyl phthalate, butadiene, isoprene, etc., can be incorporated into the styrene monomer before adding the monomeric styrene to the shaped, lightly cross-linked ethylene/vinyl acetate copolymer. These difunctional monomers can conveniently be incorporated into styrene monomer in amounts of about 0.5 to 10.0% by weight of the styrene monomer; and this preferably takes place prior to the swelling of the lightly cross-linked shaped, ethylene/vinyl acetate copolymer. After the polymerization of styrene monomer has been completed (whether or not a difunctional monomer was incorporated into the styrene monomer), the finished article will have essentially no melt flow, i.e., a melt index approximating zero. This will be of no practical consequence however since the polystyrene-ethylene/vinyl acetate article already possesses its final shape and is in fact desirable for high temperature stability.

The cross-linking agent or procedure which is employed to impart the above-indicated degrees of cross-linking prior to polymerization blending should be one which will allow the subsequent mass polymerization of the styrene monomer to proceed freely. Cross-linking agents other than organic peroxides can be utilized. For example, a partially hydrolyzed ethylene/vinyl acetate rubbery copolymer, or an ethylene/vinyl acetate/vinyloxyethanol rubbery terpolymer can be lightly cross-linked with diisocyanates, e.g., tolyl diisocyanate and the rubbery polymer swollen with styrene monomer and then subjected to mass or suspension polymerization.

POLYMERIZATION BLENDING

After the ethylene/vinyl acetate rubbery copolymer composition has been partially cross-linked, as in one of the above-indicated fashions, styrene monomer will be introduced into the copolymer composition. Surprwhere the styrene will not dissolve the slightly cross-linked rubbery copolymer, but instead will swell it highly so that with about 10 to 20% of the rubbery copolymer present there is no separate liquid phase of styrene monomer, even when the styrene monomer is added in proportions of 80 to 90% by weight of the total composition. Generally sufficient styrene monomer will be added to the partially cross-linked ethylene/vinyl acetate copolymer to cause it to increase in volume by at least 100%, but sufficient styrene monomer can be introduced to swell the ethylene/vinyl acetate copolymer up to 9 or more times its original volume. The degree of swell will, of course, be inversely proportional to the degree to which the ethylene/vinyl acetate copolymer has been lightly cross-linked. However monomeric styrene can be added until the ethylene/vinyl acetate copolymer is swelled to such an extent that it will absorb no more monomeric styrene and the ethylene/vinyl acetate copolymer exists in a relatively "super-saturated" condition. The loose monomeric styrene which has not been taken up by the ethylene/vinyl acetate copolymer can then be removed in simple fashion, e.g., by decanting. Thus the ethylene/vinyl acetate copolymer can be swelled to any desired degree of absorption of styrene monomer prior to initiating the polymerization of the styrene. It will generally be preferred to add sufficient styrene monomer to constitute at least 50% by weight of the combined weight of ethylene/vinyl acetate-monomeric styrene system, with the more preferred monomer styrene content being about 70 to about 95%.

The rubbery partially cross-linked swollen ethylene/vinyl acetate copolymer product now exists as a highly swollen gel. Then this highly swollen gel is heated in the presence of a polymerization catalyst for styrene to polymerize the monomeric styrene to polystyrene. The styrene polymerization catalyst can be added to the styrene monomer prior to absorption upon the ethylene/vinyl acetate substrate. The styrene polymerization catalysts employed can be organic peroxides such as those mentioned above as suitable cross-linking agents for the ethylene/vinyl acetate copolymer, or azo catalysts can be used. Any of the well known styrene polymerization catalysts can be employed in accordance with the procedures set forth in the present invention. Generally the styrene monomer will be polymerized by mass (bulk) polymerization procedures. In this type of polymerization procedure the styrene monomer is heated in the presence of a styrene polymerization catalyst at temperatures of about 120° C. The polymerization of the styrene monomer may be initiated at lower temperatures, e.g., about 90–100° C. and then after a brief induction period the temperature can be progressively raised to about 120–180° C. or even higher. It will sometimes be advisable to employ high pressures to accelerate the polymerization of styrene. Pressures of 2,000 to 50,000 p.s.i. can be employed in conjunction with the above-mentioned temperatures to conduct the styrene polymerization in a more efficient fashion. While it is preferred to employ heat in the polymerization of the styrene monomer, the styrene monomer can be directly polymerized at room temperature, or even below temperature in the presence of suitable catalyst systems. The styrene polymerization will generally be carried out to high conversions, and generally until at least 90% conversion to polystyrene has been achieved. Quite frequently the polymerization will advantageously be conducted until 95% or more of the styrene monomer has been converted to polystyrene. However the styrene may be polymerized to lower conversions if desired. The styrene polymerization can be conducted in a variety of apparatus. For example styrene may be polymerized by batch polymerization method wherein the styrene is continuously polymerized in successive heated zones; or the polymerization reaction may occur in a suspension system wherein the styrene-containing rubber particles are suspended in water, or other suitable suspending medium. The polystyrene portion of the ethylene/vinyl acetate-polystyrene multi-polymer composition will ordinarily have relatively high molecular weight, e.g., number average (M$n$) molecular weight values of 50,000 to 250,000 or even higher. It will generally be preferred to carry out the polymerization of the styrene monomer to a sufficiently high degree of conversion and under conditions wherein the polystyrene thus produced has a number average molecular weight substantially in excess of 50,000.

In certain instances it may be desirable to employ a combination catalyst system wherein one of the catalyst components is a low temperature styrene polymerization initiator and the other catalyst component(s) function at temperatures above that of the low temperature initiator. Such combined catalyst systems are employed quite effectively most generally in conjunction with multistage styrene polymerizations.

When preparing polystyrene-ethylene/methyl acrylate polyblend compositions, a variation of the customary bulk (mass) polymerization method of polymerizing styrene can be utilized. This variation involves suspension polymerization of styrene in aqueous media using water and tri-calcium phosphate (suspending agent) and oil soluble peroxide catalysts, e.g., benzoyl peroxide, lauroyl peroxide, etc. This suspension polymerization technique has the advantages of being a low temperature (below the boiling point of water), low pressure (autogenous pressure employed quite often), easily controllable process. In the polymerization of the novel polyblends by the suspension process, it is desirable that the monomer swollen rubber particles be sufficiently small in size that agitation and heat transfer to the water will not be prohibitively impaired. This is conveniently done by dicing, granulating, or otherwise subdividing the lightly crosslinked rubber prior to swelling with the monomer.

Plasticizers such as dioctyl phthalate, dioctyl adipate, tricresyl phosphate, dioctyl sebacate, and any other suitable plasticizers can be incorporated into the formed polymer in amounts of up to about 30% by weight of the polymer composition by mechanical blending, Banbury mixing, or any of the customary procedures well known in the art and recognized as suitable for incorporating plasticizers an additives into styrene polymers. Thermal stabilizers, antioxidants, dyes, and other additives customarily employed in amounts up to about 10% by weight to secure tailor made features can be employed in accordance with the present invention. Fillers, pigments, extenders and other like modifiers can conveniently be added in amounts of up to about 50% by weight of the total polymer content in the ultimate polyblend. Those skilled in the art, having had the benefit of the present disclosure, will be able to choose by simple tests suitable proportions of a particular additive to give a tailor made composition suitable for a particular commercial use. The ethylene/vinyl acetate-polystyrene multipolymer compositions of this invention are useful as molding compositions in making compression molded and injection molded articles, pipes, sheets, films, etc. The blends may also be used as polymerized forms, for example, as relatively rigid, high impact-resistant structural boards or supports, rigid sheets and films, etc.

MECHANICAL WORKING AFTER POLYMERIZATION BLENDING

In some cases it may be desirable to mechanically work the polymerization blended styrene-ethylene/vinyl acetate compositions at elevated temperatures, e.g., above about 100° C., to improve their gloss and melt flow characteristics. This mechanical working can be performed without encountering seriously deleterious effects with regard to impact strength and flexural deflection properties. The mechanical working operation can be carried out in any suitable apparatus such as extruding, mixing, milling and similar devices. The mechanical working is generally performed at elevated temperatures. Temperatures of about 150° C. to about 200° C. will ordinarily be employed, but higher or lower temperatures from about 100° C.–250° C. may be used if desired. Of course, the temperature employed during mechanical working should not be sufficiently high to either (1) cause thermal destruction or significant degradation of the composition, or (2) cause substantial losses in impact strength and flexural deflection properties.

MECHANICAL POLYBLENDING

The mechanical polyblending procedure involves slightly curing the preformed ethylene/vinyl acetate copolymer (in the same fashion as in the polymerization polyblending) followed by intimately mechanically admixing said copolymer with preformed polystyrene. This "mechanical" mixing can be done manually, as by stirring; or it can be carried out by milling on steam heated mill rolls; extruding in standard extruding machines; mixing in a Banbury mixer; or mixing emulsions, suspensions, or dispersions of the two preformed polymers, and coagulating same; or by combination of any of the above indicated mechanical blending procedures.

Generally this mechanical blending will be accomplished at elevated temperatures, e.g., temperatures in the neighborhood of 150 to 250° C., and will be carried out for a sufficient period of time to allow the two polymers to be intimately and homogeneously associated with one another. This mechanical blending may be conducted for a period of time of from several minutes up to 24 hours or more depending upon the particular mechanical blending technique selected and the operating temperature chosen. Frequently the requisite blending can be insured by mechanically blending the two preformed polymers at about 150° C.–200° C. for thirty minutes or less.

As previously mentioned the description of the ethylene/vinyl acetate copolymers and the blending procedures employed in forming E/VA blends with styrene polymers apply equally as well to ethylene-methyl acrylate copolymers. Thus the molecular weights; compositional contests; melt indices; mechanical and polymerization blending procedures and weight ratios for preparing blends; utilities and applications of the blended compositions; conditions under which styrene monomer is polymerized into the lightly cured rubbery copolymeric "network"; degree of light curing to which the copolymer is subjected prior to blending (as reflected by swelling with styrene monomer); dimensional stability following geometrically uniform expansion; compounding plasticizers, antioxidants, processing and heat stabilizers, fillers, dyes, pigments, etc.; as stated for ethylene/vinyl acetate are essentially identical to those used in conjunction with ethylene/methyl acrylate copolymers. A few minor differences between ethylene/vinyl acetate and ethylene/methyl acrylate were noticed, however, and these variations as applicable to an understanding of the present invention are discussed for purposes of clarity. The most significant variance which was noted concerns the amount of curing agent which is required to impart an ethylene/methyl acrylate copolymer with the equivalent degree of cure given to a comparable ethylene/vinyl acetate copolymer. In general from two to five times the amount of crosslinking agent (e.g., dicumyl peroxide) is needed to give ethylene/methyl acrylate copolymers the same degree of cure as is required for the comparable ethylene/vinyl acetate copolymers. Of course, this holds true for the curing agent concentrations requisite for both the production of styrene-ethylene/methyl acrylate blended compositions which are subjected to the degradative influences of mechanical shearing and thermal energy, such as are experienced with compositions used in molding applications wherein the molding is performed after the styrene monomer has been polymerized, and the preparation of styrene-ethylene/methyl acrylate polyblends used in applications where the shaping operation is conducted prior to polymerizing the styrene monomer. On a weight percent basis (based on copolymer) the concentration of curing agent employed for ethylene/methyl acrylate copolymers used in preparing polyblends with polystyrene will vary from about 0.1 to 1.25% (compositions which are to be molded subsequent to polymerization of styrene) to about 1.25 to 5.0% (compositions shaped prior to styrene polymerization).

Another notable variation resides in the preferred manner of preparing the rubbery ethylene/methyl acrylate copolymers. Since the ethylene/methyl acrylate copolymers do not hydrolyze as readily as ethylene/vinyl acetate copolymers, it may be preferable to employ emulsion copolymerization in preparing the ethylene/methyl acrylate copolymers. Mixed monomer feeds are preferably employed in cases where the polymerization is carried to a high degree of conversion since the monomeric methyl acrylate tends to enter into the copolymerization reaction at a faster rate, approximately five times the reactivity rate of ethylene monomer. The compositional constitution of the ethylene/methyl acrylate copolymer should be fairly uniform from the first conversion to the last in order to preserve homogenity in copolymer properties if the polymerization reaction is carried to a substantially complete conversion. Mixed monomer feed techniques (i.e., addition of ethylene and methyl acrylate in varying monomeric proportions as the progress of the copolymerization develops at different conversions to copolymer) such as are already known in the art can therefore be conveniently utilized to insure homogeneity in the copolymer where conversions of about 50% or higher are desired. It should be noted here however, that the ethylene/methyl acrylate copolymers can be quite satisfactorily prepared in tubular reactors by bulk (mass) polymerization where lower conversions, e.g., 10-30% are sufficiently satisfactory.

While the foregoing remarks in conjunction with the ethylene/acrylate copolymers were specifically directed to ethylene/methyl acrylate copolymers, it should be realized that other monoolefinically unsaturated lower alkyl esters of acrylic acid can be employed in preparing the polyblend compositions of the present invention. Ethyl acrylate, propyl acrylate, butyl acrylate, etc., can be listed as exemplary lower alkyl acrylate monomers which can be used in place of methyl acrylate in accordance with the present invention. Methyl acrylate is the preferred acrylate monomer however since it is more difficult to secure the desired light curing of ethylene/lower alkyl acrylate copolymers having the relatively longer side chains, e.g., ethylene/propyl acrylate and ethylene/butyl acrylate copolymers. This difficulty in partial cross-linking, it is thought, is partially due to factors of steric hindrance although this may not be the sole cause.

The same additives, e.g., thermal stabilizers, antioxidants, dyes, pigments, fillers, plasticizers, etc., can be added prior to or during the mechanical polyblending as were mentioned above in conjunction with the polymerization blending procedure, and the mechanically polyblended styrene-ethylene/vinyl acetate and styrene-ethylene/methyl acrylate compositions are applicable to the same uses as those recited for the polymerization blends.

The following examples provide details of certain preferred embodiments of the present invention. The data are to be taken as exemplary, and the invention in its broadest aspects is not limited to the particular conditions, proportions, and materials set forth therein.

*Example 1.—Polymerization polyblending*

The below indicated small amounts of essentially pure dicumyl peroxide curing agent (having the trade name "Dicup-R") were incorporated into samples of an ethylene/vinyl acetate copolymer having an ethylene to vinyl acetate monomer ratio of 56 to 44 respectively (parts by weight). Each sample was then thoroughly homogenized on a mill roll to insure that the cross-linking agent was homogeneously dispersed with the copolymer. The samples were then partially cured by heating for 45 minutes at 305° F. After this partial curing the below indicated parts by weight of slightly cured polymer were placed in a polymerization vessel, and styrene monomer was added thereto in the noted weight ratio. Three drops of ditertiary-butyl peroxide (styrene polymerization catalyst) (0.03% by weight of styrene monomer) were then added to each vessel followed by flushing with nitrogen. Each sample of partially cured ethylene/vinyl acetate copolymer swelled considerably until no free liquid styrene monomer was visibly noticeable. It appeared to be completely absorbed by the partially cured copolymer. The polymerization vessels were then sealed and placed in a tumbling device which provides adequate mechanical agitation during polymerization. The polymerization of the styrene was conducted in three stages. During the first stage the temperature was maintained at 90° C. for 24 hours. This was followed by a second stage wherein the polymerization temperature was held at 120° C. for 24 hours. Then during the final stage, which lasted six hours, the polymerization temperature was kept at 180° C.

Then the reactor vessels were removed from the tumbler and gradually cooled to room temperature. The polymerization blended polystyrene-ethylene/vinyl acetate compositions were removed from the vessels ground, and injection molded on a 1 oz. Watson-Stillman machine at 200° C. into a die with cavities for tensile, flexural, and impact bar specimens. The injection molded samples were then tested for their impact strength and flexural deflection. These tests were conducted under standard ASTM procedures. The impact strength was measured by the Izod method as set forth in ASTM D-256-47T, and the flexural deflection test was conducted in accordance with ASTM D-790-49T. In Table I the ethylene/vinyl acetate copolymer will be abbreviated by "E/VA." It will be noted that all of the polystyrene-E/VA polymerization polyblend compositions gave a "no break" reading in the flexural deflection test. This is in marked contrast to the polystyrene homopolymer, per se, which served as a control.

TABLE 1

| Run | Concentration of curing agent, dicumyl peroxide, (percent by weight of E/VA copolymer) | Wt. ratio of styrene monomer to E/VA copolymer | Impact strength (ft. lbs./inch of notch) | Melt Index (decigrams/minute) | Flexural deflection (inches at break) |
| --- | --- | --- | --- | --- | --- |
| Control [1] | | | 0.33 | 1.34 | 0.240 |
| 1 | 0.05 | 80/20 | 7.81 | 0.14 | No break |
| 2 | 0.07 | 80/20 | 5.18 | 0.06 | No break |
| 3 | 0.09 | 80/20 | 4.54 | 0.06 | No break |
| 4 | 0.11 | 80/20 | 4.51 | 0.10 | No break |
| 5 | 0.05 | 85/15 | 5.23 | 0.13 | No break |
| 6 | 0.07 | 85/15 | 5.17 | 0.20 | No break |
| 7 | 0.09 | 85/15 | 4.95 | 0.22 | No break |
| 8 | 0.11 | 85/15 | 4.73 | 0.17 | No break |
| 9 | 0.13 | 85/15 | 3.23 | 0.20 | No break |
| 10 | 0.15 | 85/15 | 4.05 | 0.19 | No break |

[1] Contained polystyrene alone.
The "no break" reading indicates that the sample did not break at a 0.8 inch deflection.
The melt index values are those secured according to ASTM 1238-57T at 190° C.

*Example 2.—Mechanical working after polymerization polyblending*

A composite styrene-E/VA polymerization blended composition was prepared using approximately equal amounts of the 8/20 styrene-E/VA compositions of Runs 2, 3, and 4 of Example 1. This composite was mechanically worked by extruding it at 175° C. through an NRM electrically heated, single-screw extruder. The composite composition was then cooled, pelleted, and test specimens were molded therefrom as in Example 1. No phase separation occurred. The impact strength and flexural deflection tests were conducted as in Example 1. The composite composition showed an impact strength of 5.63 ft. lbs. with "no break" in the flexural deflection test. It will be noted that no loss of impact strength and flexural deflection properties occurred despite mechanical working at elevated temperature. Melt flow, as exemplified by the composition's melt index of 0.41 decigram/minute at 190° C., was also markedly increased by the mechanical working described.

*Example 3.—Mechanical polyblending*

Ethylene-vinyl acetate copolymer having an ethylene to vinyl acetate monomeric ratio in parts by weight of 57 to 43, respectively, was thoroughly mixed with small amounts of a curing agent, dicumyl peroxide, in the below indicated amounts to form curable E/VA compositions. These E/VA compositions were lightly cured at 305° F. for 45 minutes as in Example 1. Then these partially cured E/VA copolymer compositions were mill roll blended for five minutes with polystyrene homopolymer in the below indicated proportions by weight. The polystyrene had a number average molecular weight of approximately 150,000 and is the product sold under the trade name "Hi-Test 99." Then the copolymer compositions were extruded for two passes through a single screw extruder at 200° C. to complete the mechanical polyblending procedure. Test specimens were injection molded from these mechanical polyblends at 200° C. on a 1 oz. Watson-Stillman injector. The tests (flexural, impact and melt index) were conducted under standard ASTM procedures as in Example 1. The results thereof are given in Table 2 below.

TABLE 2

| Run | Concentration of curing agent (percent by wt. of E/VA copolymer) | Wt. ratio of polystyrene to E/VA | Impact strength (ft. lbs./inch of notch) | Melt Index (decigrams/minute) | Flexural deflection (inches at break) |
| --- | --- | --- | --- | --- | --- |
| Control [1] | | | 0.3 | 2.7 | 0.21 |
| 1 | 0.07 | 95/5 | 0.6 | 2.2 | 0.25 |
| 2 | 0.12 | 95/5 | 0.6 | 2.2 | 0.25 |
| 3 | 0.20 | 95/5 | 0.6 | 2.1 | 0.22 |
| 4 | 0.07 | 90/10 | 1.0 | 1.8 | 0.22 |
| 5 | 0.12 | 90/10 | 0.7 | 1.7 | 0.31 |
| 6 | 0.20 | 90/10 | 0.7 | 1.9 | 0.20 |

[1] Contained polystyrene ("Hi-Test 99") alone.

While the mechanical polyblend polystyrene-E/VA compositions possess an improved impact strength compared with that of polystyrene alone, the improvement in impact strength secured by mechanical polyblending is not as marked as that attainable by polymerization polyblending as in Ex. 1. The flexural deflection values of the mechanical polyblends in general offer a slight improvement over polystyrene, itself.

*Example 4*

The below indicated small amounts of essentially pure dicumyl peroxide were incorporated into samples of an ethylene/methyl acrylate copolymer containing 42.2% by weight ethylene and 57.8% by weight methyl acrylate. The samples were milled and lightly cured according to the procedure as in Example 1. After this partial curing the below indicated parts by weight of lightly cured ethylene/methyl acrylate copolymer were placed in a polymerization vessel, and styrene monomer was added thereto in the noted weight ratio. Three drops of di-tertiary-butyl peroxide (.03% by weight of styrene monomer) were then added to each vessel followed by flushing with nitrogen. Each sample of lightly cross-linked ethylene/methyl acrylate copolymer swelled considerably until no free liquid styrene monomer was visibly noticeable. The styrene monomer appeared to be completely absorbed by the copolymer. The styrene was then polymerized as in Example 1. The polystyrene-ethylene/methyl acrylate polyblend compositions were injection molded and test specimens prepared therefrom as in Example 1. The tests were conducted under the standard ASTM procedures as in Example 1, and the test values are given in Table 3 below. In Table 3 the ethylene/methyl acrylate copolymer will be abbreviated by "E/MAR."

TABLE 3

| Run | Concentration of curing agent (percent by weight of E/MAR copolymer) | Wt. ratio of styrene monomer to E/MAR copolymer [1] | Impact strength (ft. lbs./inch of notch) | Melt Index (decigrams per minute at 190° C.) | Flexural deflection (inches at break) |
| --- | --- | --- | --- | --- | --- |
| 1 | 0.4 | 90/10 | 0.88 | 0.24 | 0.25 |
| 2 | 0.4 | 80/20 | 7.72 | 0.19 | No break [1] |
| 3 | 0.8 | 90/10 | 1.63 | 0.22 | 0.27 |
| 4 | 0.8 | 80/20 | 8.29 | 0.06 | 0.29 |

[1] The E/MAR copolymer was prepared in a tubular reactor at high pressures (~35,000 p.s.i.) by a peroxide catalyzed mass (bulk) copolymerization carried to a low conversion (~20%) at polymerization temperatures generally employed in the high pressure polymerization of ethylene.

[2] The "no break" reading indicates no break at a 0.8 inch deflection.

While the invention has been described herein with particular reference to various preferred embodiments thereof, it will be appreciated that variations from the details given herein can be effected without departing from the invention in its broadest aspects. It is to be understood therefore that changes and variations can be made without departing from the spirit and scope of the invention.

I claim:

1. A blend of polystyrene with a lightly cross-linked copolymer of ethylene and a monoolefinically unsaturated ester monomer selected from the group consisting of vinyl acetate and a lower alkyl acrylate, said lightly cross-linked copolymer having at least one cross-linked per 1000 monomer units and no more than one cross-link per 100 monomer units and obtained by heating said copolymer to temperatures of 100 to 200° C. with up to 2.5% by weight thereof of organic peroxide curing agent.

2. A blend of polystyrene with a lightly cross-linked copolymer of ethylene and a monoolefinically unsaturated ester monomer which contains four carbon atoms and only carbon, hydrogen and oxygen, said lightly cross-linked copolymer having at least one cross-link per 1000 monomer units and no more than one cross-link per 100 monomer units and obtained by heating said copolymer to temperatures of 100 to 200° C. with up to 2.5% by weight thereof of organic peroxide curing agent.

3. A blend of polystyrene with a lightly cross-linked ethylene/vinyl acetate copolymer, said lightly cross-linked copolymer having at least one cross-link per 1000 monomer units and no more than one cross-link per 100 monomer units and obtained by heating said copolymer to temperatures of 100 to 200° C. with up to 2.5% by weight thereof of organic peroxide curing agent.

4. A blend of polystyrene with a lightly cross-linked ethylene/methyl acrylate copolymer, said lightly cross-linked copolymer having at least one cross-link per 1000 monomer units and no more than one cross-link per 100 monomer units and obtained by heating said copolymer to temperatures of 100 to 200° C. with up to 2.5% by weight thereof of organic peroxide curing agent.

5. A blend of a styrene homopolymer with a minor amount of a lightly cross-linked ethylene/vinyl acetate copolymer, said copolymer comprising about 40 parts to about 55 parts of vinyl acetate per 100 parts of copolymer, all parts being by weight, and said lightly cross-linked copolymer having at least one cross-link per 1000 monomer units and no more than one cross-link per 100 monomer units and obtained by heating said copolymer to temperatures of 100 to 200° C. with up to 2.5% by weight thereof of organic peroxide curing agent.

6. A tough, impact-resistant blended composition comprising about 70 to about 95 parts by weight of a styrene homopolymer and about 5 to about 30 parts by weight of a lightly cross-linked ethylene/vinyl acetate copolymer having a number average molecular weight of about 10,000 to about 30,000 and wherein said copolymer comprises about 40 parts to about 55 parts of vinyl acetate per 100 parts of copolymer, all parts being by weight, and said lightly cross-linked copolymer having at least one cross-link per 1000 monomer units and no more than one cross-link per 100 monomer units and obtained by heating said copolymer to temperatures of 100 to 200° C. with up to 2.5% by weight thereof of organic peroxide curing agent.

7. The composition of claim 6 further characterized by a notched Izod impact strength of at least 3.0 ft. lbs./inch of notch and a flexural deflection without break of at least 0.8 inch.

8. The method of preparing a blended composition comprising polystyrene and a lightly cross-linked ethylene/vinyl acetate copolymer which method comprises providing an ethylene/vinyl acetate copolymer, lightly cross-linking said copolymer by heating same at about 100 to 200° C. with 0.05 to 0.25% by weight thereof of organic peroxide, to obtain copolymer having at least one cross-link per 1000 monomer units and no more than one cross-link per 100 monomer units, and then blending polystyrene with said partially cross-linked ethylene/vinyl acetate copolymer to intimately associate the polystyrene with said copolymer.

9. The method of claim 8 wherein the cross-linking is performed by the use of a cross-linking agent which comprises dicumyl peroxide.

10. The method of claim 8 wherein the blending of polystyrene with the partially cross-linked ethylene/vinyl acetate copolymer is accomplished by intimately mechanically admixing polystyrene with said copolymer.

11. The method of claim 8 wherein the blending of polystyrene with the lightly cross-linked ethylene/vinyl acetate copolymer is accomplished by swelling said lightly cross-linked copolymer with monomeric styrene, and then polymerizing the styrene monomer in the presence of said lightly cross-linked swollen copolymer.

12. The method of producing dimensionally stable articles which comprises providing an ethylene/vinyl acetate copolymer, shaping said copolymer, lightly cross-linking said copolymer by heating same with up to about 2.5% by weight thereof of organic peroxide to temperatures of 100 to 200° C. to obtain copolymer having at least one cross-link per 1000 monomer units and no more than one cross-link per 100 monomer units, swelling said shaped, lightly cross-linked copolymer with monomeric styrene, and then polymerizing the styrene monomer in the presence of the shaped, lightly cross-linked, swollen ethylene/vinyl acetate copolymer to produce a dimensionally stable geometrically uniformly expanded article wherein the degree of uniform expansion is proportional to the degree to which the monomeric styrene has swollen the shaped, lightly cross-linked, ethylene/vinyl acetate copolymer.

13. The method of claim 12 wherein the shaping of the ethylene/vinyl acetate copolymer is performed prior to lightly cross-linking said copolymer.

14. The method of claim 12 wherein the said cross-linking is carried out by homogeneously incorporating into the ethylene/vinyl acetate copolymer up to 0.5% by weight thereof of organic peroxide prior to shaping and heating the shaped copolymer to activate the cross-linking agent.

15. The method of claim 12 which includes the step of incorporating 0.5 to 10% by weight of divinyl benzene into the monomeric styrene prior to swelling the ethylene/vinyl acetate copolymer to thereby impart thermosetting properties to said articles.

16. A tough, impact-resistant dimensionally stable article comprising a blend of polystyrene with a lightly cross-linked ethylene/vinyl acetate copolymer obtained by heating said copolymer with up to 2.5% by weight thereof of organic peroxide curing agent to temperatures of 100 to 200° C. to obtain copolymer having at least one cross-link per 1000 monomer units and no more than one cross-link per 100 monomer units, said article being characterized as a three dimensional geometrically uniform expansion of a shaped composition of said copolymer.

17. A tough, impact-resistant, dimensionally stable article comprising a blend of polystyrene with a lightly cross-linked ethylene/vinyl acetate copolymer obtained by heating said copolymer with up to 2.5% by weight thereof of organic peroxide curing agent to temperatures of 100 to 200° C. to obtain copolymer having at least one cross-link per 1000 monomer units and no more than one cross-link per 100 monomer units and wherein said blend has a melt index at 190° C. of zero and substantially no melt flow, said article being characterized as a three dimensional, geometrically uniform expansion of a shaped composition of said copolymer.

18. A tough impact-resistant, dimensionally stable article comprising a blend of polystyrene with a lightly cross-linked ethylene/vinyl acetate copolymer obtained by heating said copolymer with up to 0.5% by weight thereof of organic peroxide curing agent to temperatures of 100 to 200° C. to obtain copolymer having at least one cross-link per 1000 monomer units and no more than one cross-link per 100 monomer units wherein said blend has significant melt flow and a melt index of 0.05 to 25.0 decigrams per minute at 190° C., said article being characterized as a three dimensional, geometrically uniform expansion of a shaped composition of said copolymer.

References Cited by the Examiner

UNITED STATES PATENTS 2,907,675   10/1959   Gaylord _____ 260—878

MURRAY TILLMAN, Primary Examiner.

WILLIAM H. SHORT, LEON J. BERCOVITZ, Examiners.